T. MIDGLEY.
TIRE BUILDING MACHINE.
APPLICATION FILED MAR. 18, 1914.
1,161,948.
Patented Nov. 30, 1915.
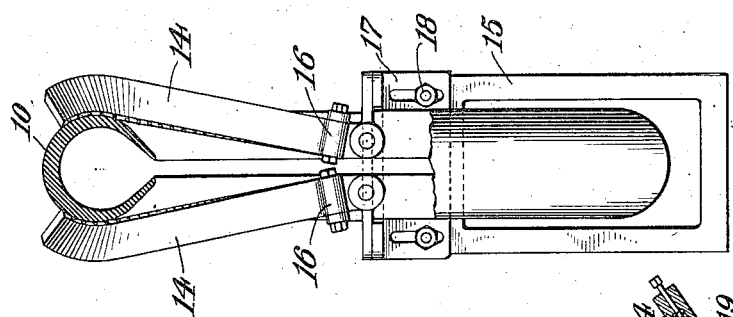
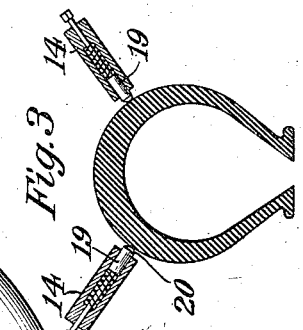
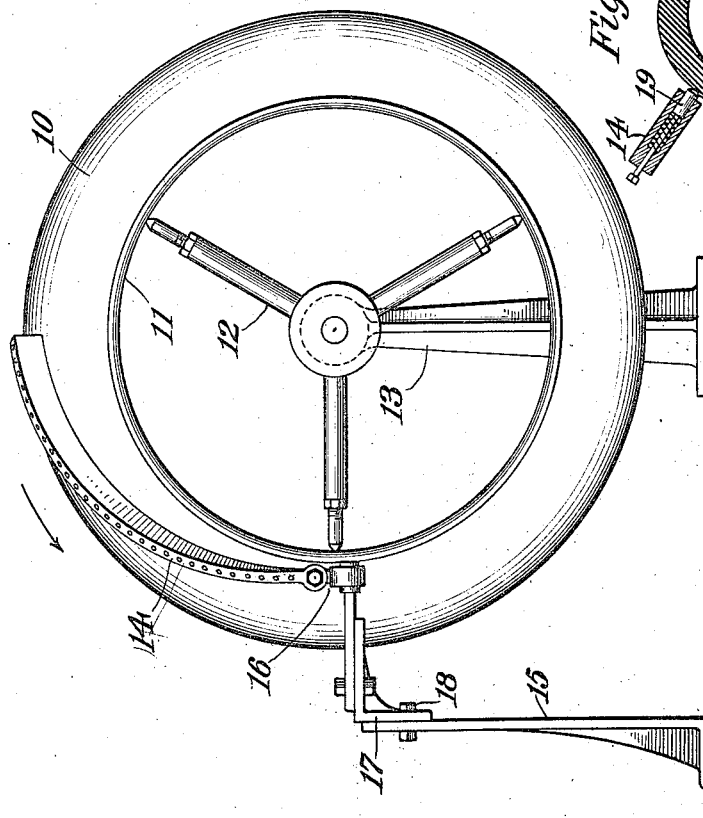
Witnesses:
Veronica Braun
Francis Boyle
Thomas Midgley  Inventor
By his Attorney
Ernest Hopkinson

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

TIRE-BUILDING MACHINE.

1,161,948. Specification of Letters Patent. Patented Nov. 30, 1915.

Application filed March 18, 1914. Serial No. 825,482.

*To all whom it may concern:*

Be it known that I, THOMAS MIDGLEY, a citizen of the United States, residing at Worthington, county of Franklin, State of Ohio, have invented certain new and useful Improvements in Tire-Building Machines, of which the following is a full, clear, and exact disclosure.

This invention relates to tire building machines and has for an object to provide a machine for smoothing down the tire in such a manner as to remove inequalities in the surface thereof.

In the manufacture of tires, it is customary to employ a revoluble ring form upon which the tire is built from successive layers of fabric pressed to conform intimately to the configuration of the ring form. The present invention provides a smoothing device adapted to operate upon the surface of the tire thus formed to smooth out inequalities and press the layers into more intimate association with each other, whereby the tire is more compactly and more nicely shaped to the ring form than is possible with the ordinary methods now in use.

With the above objects in view, the invention consists in certain novel details of construction and the combination of parts hereinafter fully described and claimed, it being understood that various modifications may be resorted to within the scope of the appended claims.

In the accompanying drawing forming part of this specification—Figure 1 is a side elevation showing one embodiment of my invention; Fig. 2 is an end elevation of the parts shown in Fig. 1 with portions removed and portions broken away; Fig. 3 is a fragmentary sectional view showing the construction of the plungers.

Referring now to the drawing, in which like characters of reference designate similar parts, 10 designates a tire which is supported upon a ring form 11 of the usual and well known type, the form being carried on a frame 12 which is mounted for rotation on a support 13.

In carrying out my invention, I provide a pair of smoothing arms 14, one for each side of the tire, each arm being preferably formed of such length as to operate upon a quadrant of the related side of the tire, and being longitudinally curved to conform to the curvature of the tire from near the medial portion of the tire to near the base portion of the tire in said quadrant, as best shown in Figs. 1 and 2. A standard 15 supports both arms, each arm being connected by a universal joint 16 to a common plate 17, which is mounted for vertical adjustment on the standard by means of adjusting bolts 18.

Each arm is equipped with a longitudinal series of spring-pressed plungers 19, which project through the inner edge of the arm and are terminally rounded as shown at 20, so as not to cut the tire. The plungers extend transversely across the arm and are each inclined radially in a receding or acute angle with respect to the plane of the ring form. The plungers are so spaced apart that the surface operated on by any particular plunger will be overlapped by the surface operated upon by the next succeeding plunger, whereby during a single revolution of the tire, every portion of the annular surface generated by the smoothing arm will be operated upon.

In operation the ring form with the tire thereon is rotated and the smoothing arms 14 are then manually or otherwise rocked toward the tire to force the plungers against the lateral surfaces thereof. During rotation of the tire, the plungers of each arm generate contiguous concentric rings on the related side of the tire, thereby intimately attaching the various fabric layers together at points coincident with said rings. Since the plungers are inclined at receding or acute angles with respect to the plane of the form, they operate to draw the layers radially from the medial portion of the tire toward the base of the tire during this compacting of the layers together, whereby creases and other wrinkles which may be formed in the tire during its manufacture are smoothed out and a homogeneous tire devoid of inequalities produced.

Having thus described my invention, what I claim and desire to protect by Letters Patent is:

1. A tire building machine embodying a revoluble ring form for the tire, a smoothing arm disposed circumferentially to one side of the form and conforming to the curvature from near the medial portion to near the base portion of the tire to be formed, and yielding members disposed longitudinally of the arm for contact with the tire.

2. A tire building machine embodying a revoluble ring form for the tire, an arcuate smoothing arm disposed circumferentially of one side of the tire and having a longitudinal twist to conform to the curvature from near the medial portion to near the base portion of the tire to be formed, and yielding members disposed longitudinally of the arm for contact with the tire.

3. A tire building machine embodying a revoluble ring form for the tire, a smoothing arm disposed circumferentially of one side of the form and conforming to the curvature from near the medial portion to near the base portion of the tire to be formed, and yielding plungers on the arm for contact with the tire disposed in receding angles from the plane of the form.

4. A tire building machine embodying a revoluble ring form for the tire, a smoothing arm disposed circumferentially of one side of the tire and conforming to the curvature from near the medial portion to near the base portion of the tire to be formed, and spring-pressed plungers carried by the arm for contact with the tire and disposed at receding angles to the plane of the form.

5. A tire building machine embodying a revoluble ring form for the tire, and a series of spring-pressed plungers extending circumferentially of one side of the form and inclined at receding angles to the plane of the form for contact with the tire to be formed.

Signed at Detroit, county of Wayne, State of Michigan, this 13th day of March, 1914.

THOMAS MIDGLEY.

Witnesses:
 E. LA BUSCHEWSKY,
 J. H. SWIFT.

Copies of this patent may be obtained for five cents each, by addressing the "Commissioner of Patents, Washington, D. C."